United States Patent [19]

Ishii et al.

[11] Patent Number: 4,659,615

[45] Date of Patent: Apr. 21, 1987

[54] COPOLYESTER FILM AND A HOT MELT ADHESIVE COMPRISING SAID FILM

[75] Inventors: Masao Ishii; Keishiro Igi, both of Kurashiki, Japan

[73] Assignee: Kuraray Company, Ltd., Kurashiki, Japan

[21] Appl. No.: 730,055

[22] Filed: May 3, 1985

[30] Foreign Application Priority Data

May 14, 1984 [JP] Japan .................... 59-97357

[51] Int. Cl.$^4$ .................... B32B 27/06; B32B 27/36
[52] U.S. Cl. ...................... 428/220; 428/480
[58] Field of Search .............. 428/458, 480, 220, 35

[56] References Cited

U.S. PATENT DOCUMENTS

| | | | |
|---|---|---|---|
| 4,299,934 | 11/1981 | Petke et al. | 428/458 |
| 4,363,853 | 12/1982 | Imamura et al. | |
| 4,500,575 | 2/1985 | Taira et al. | 428/35 |

FOREIGN PATENT DOCUMENTS

| | | | |
|---|---|---|---|
| 2535336 | 5/1984 | France. | |
| 53-36529 | 4/1978 | Japan | 428/458 |
| 53-172984 | 10/1978 | Japan | 428/458 |

OTHER PUBLICATIONS

Patents Abstracts of Japan, vol. 6, No. 29 (M-113) (907), 2/20/82; & JP-A-56 146 723 (Kuraray K.K.) 14-11-1981, Abstract.

Patents Abstracts of Japan, vol. 6, No. 208 (C-130) (1086), 10/20/82; & JP-A-57 115 475 (Teijin K.K.) 17-07-1982, Abstract.

Primary Examiner—Allan M. Lieberman
Attorney, Agent, or Firm—Oblon, Fisher, Spivak, McClelland & Maier

[57] ABSTRACT

A copolyester film comprising: (a) a copolyester which comprises, as a dicarboxylic acid component, 80 to 97 mole percent of terephthalic acid and 3 to 20 mole percent of isophthalic acid and, as a diol component, 60 to 85 mole percent of 1,4-butanediol and 15 to 40 mole percent of diethylene glycol, and said copolyester having a reduced viscosity in the range of 0.8 to 1.4 dl/g and a melting point in the range of 160° to 200° C.; and said film having (b) a heat of crystal fusion in the range of 5 to 10 cal/g, (c) a haze value in the range of 5 to 35 percent, and (d) an initial Young's modulus in the range of $3 \times 10^3$ kg/cm$^2$ to $30 \times 10^3$ kg/cm$^2$. A hot melt adhesive comprising said film is also provided. This hot melt adhesive has excellent high speed bonding characteristics, durability and high bond strength with respect to substrates.

10 Claims, No Drawings

COPOLYESTER FILM AND A HOT MELT ADHESIVE COMPRISING SAID FILM

BACKGROUND OF THE INVENTION

1. Field of the Invention

This invention relates to a copolyester film and a hot melt adhesive of said film.

2. Description of the Prior Art

In recent years, hot melt adhesives have been used in increasing quantities in view of their non-polluting, energy-saving and resource-conservation characteristics. Hot melt adhesives of the film type, in particular, are known to be advantageous in that they make for uniformity of thickness of the adhesive layer and a stable and uniform bond strength, as well as in that as the desired adhesion can be established by mere melting of the superficial layer of the film, they lend themselves well to a short-time bonding process and require a minimum of bonding heat. Moreover, the thermal degradation of the adhesive is negligible.

Hot melt adhesives of the polyester type are well known. These adhesives are excellent in heat- and cold-resistance, thermal stability, electrical properties, weather resistance, moisture resistance, resistance to chemicals and safety in food use, and have therefore been used widely in such applications as electrical parts assembly, automotive parts assembly, textiles, can manufacture, etc.

In regard to polyester hot melt adhesives, many proposals have heretofore been made. For example, a hot melt adhesive of polyesters derived from a selected dicarboxylic acid component and a selected diol component having a special structural formula as the polyester materials is well known. Also known is a hot melt adhesive of polymers having a carboxylic acid amide, carboxylic acid anhydride, carboxylic acid ester, urethane or urea bond either in the backbone chain or in the side chain (Japanese Patent Publication No. 22750/82). It is, thus, possible to improve a given property by using selected components or a selected combination of components, but such an attempt tends to result in changes in other physical properties.

U.S. Pat. No. 4,143,790 discloses a polyester hot melt adhesive wherein at least 45 mole % of the dicarboxylic acid component is accounted for by terephthalic acid and at least 55 mole % of the diol component is accounted for by 1,4-butanediol and its relative viscosity and degree of crystallinity are in the range of 1.2 to 1.8 and in the range of 0 to 30 percent, respectively. U.S. Pat. No. 3,515,628 teaches a polyester copolymer-based hot melt adhesive such that its dibasic acid component is a mixture of terephthalic acid and an aliphatic dicarboxylic acid and its glycol component is either 1,4-butanediol or a mixture of 1,4-butanediol and ethylene glycol, neopentyl glycol or the like, with a glass transition point not higher than 30° C. and a degree of crystallinity not exceeding 25%. U.S. Pat. No. 4,335,188 describes a copolyester hot melt adhesive in which at least 85 mole % of its dicarboxylic acid component is terephthalic acid and its diol component is a mixture of 97 to 65 mole % of 1,4-butanediol and 3 to 35 mole % of polyethylene glycol having a molecular weight in the range of 150 to 550. Further, Japanese Patent Application Laid-Open No. 78234/84 discloses a hot melt adhesive comprising a polyester copolymer consisting of a dibasic acid component made from 70 to 90 mole % of terephthalic acid and the balance of other dibasic acids, 70 to 97 mole % of 1,4-butanediol and 3 to 30 mole % of diethylene glycol, with a reduced viscosity of at least 0.6 dl/g, a glass transition point not less than 31° C. and a degree of crystallinity in the range of 15 to 40%.

However, as the scope of their application was expanded, the performance characteristics required of hot melt adhesives became more diversified or critical. The characteristics required include the following.

(a) High bonding strength with respect to substrates
(b) Good balance between tensile shear bonding strength and peel strength
(c) Adaptability to high-speed bonding procedures
(d) Good bonding workability
(e) Durability under varied conditions
(f) Stable quality
(g) Adaptability to food packaging

OBJECTS OF THE INVENTION

It is an object of this invention to provide a copolyester film having a high bond strength for substrates, a good balance between tensile shear bonding strength and peel strength and a high degree of durability, and a hot melt adhesive comprising said film.

It is another object of this invention to provide a hot melt adhesive having a stable quality and a good bonding workability.

It is a further object of this invention to provide a hot melt adhesive which is conducive to safety and sanitation in food packaging applications.

DETAILED DESCRIPTION OF THE INVENTION

It has been found that in using a hot melt adhesive in film form, characteristics of the hot melt adhesive can be varied widely not only by selecting suitable components of comonomers but also by selecting a suitable set of conditions for the molding of such hot melt adhesive into a film. Namely, it has been found that the aforementioned problems can be completely resolved by selecting proper dicarboxylic acids and diol components for a polyester and employing some defined physicochemical constants of the copolyester film produced by using such selected components.

Thus the invention provides a copolyester film comprising: (a) a copolyester comprising, as a dicarboxylic acid component, 80 to 97 mole % of terephthalic acid and 3 to 20 mole % of isophthalic acid and, as a diol component, 60 to 85 mole % of 1,4-butanediol and 15 to 40 mole % of diethylene glycol, with a reduced viscosity in the range of 0.8 to 1.4 dl/g and a melting point in the range of 160 to 200° C.; and said film having (b) a heat of crystal fusion in the range of 5 to 10 cal/g, (c) a haze value in the range of 5 to 35%, and (d) an initial Young's modulus of elasticity in the range of $3 \times 10^3$ to $30 \times 10^3$ kg/cm$^2$, and to a hot melt adhesive comprising said film.

The copolyester of the present invention may be prepared by conventional techniques. Namely, the copolyester may be prepared by ester interchange of diols and dialkyl esters of dicarboxylic acids or by direct esterification of diols and dicarboxylic acids.

It is as important in this invention as in the prior art technology to select the proper copolyester composition and it is essential to ensure that the composition falls within the above-defined ranges.

Referring, first, to the dicarboxylic acid component, it is important that terephthalic acid be its major constituent with a minor amount of isophthalic acid contained. Aside from isophthalic acid, the known acids for hot melt adhesives include aromatic dicarboxylic acids such as orthophthalic acid, naphthalenedicarboxylic acid, 1,2-bis(p-carboxyphenoxy)ethane, and aliphatic dicarboxylic acids such as succinic acid, adipic acid, sebacic acid, etc. However, polyesters produced using such dicarboxylic acids as comonomers do not have the film properties to be mentioned hereinafter or, if they do, the aforementioned objects of this invention cannot be accomplished. By way of illustration, film of a polyester consisting of an aliphatic dicarboxylic acid such as adipic acid or sebacic acid as a comonomer unit is generally low in initial Young's modulus and poor in film production workability and, in addition, has a disadvantage that it tends to stretch when the temperature of the production environment is high. Moreover, it is poor in dimensional stability in the temporary bonding process and does not easily provide a uniform bond. Any film containing one or more aromatic dicarboxylic acids other than isophthalic acid as the sole dicarboxylic acid component is markedly low in crystallinity and inadequate in bond strength.

Terephthalic acid, as used in the practice of this invention, preferably accounts for at least 80 mole percent of the dicarboxylic acid component in order that the copolyester may have suitable crystalline characteristics. If its proportion is less than 80 mole percent, it is impossible to obtain the adhesion required of a hot melt adhesive even if any other acid components are added. The preferred proportion of terephthalic acid is in the range of 85 to 95 mole percent of the dicarboxylic acid component.

If the proportion of isophthalic acid in the dicarboxylic acid component is too low, there will be an increased percentage of spherical crystals so that the disadvantages of inadequate peel strength and poor impact resistance are inevitable. On the other hand, if the proportion of isophthalic acid exceeds the level of 20 mole percent relative to the total amount of said acid component, the degree of crystallinity is decreased so that sufficient tensile shear bonding strength cannot be obtained. The preferred proportion of isophthalic acid is in the range of 5 to 15 mole percent of the whole dicarboxylic acid component.

In addition to the above essential acids, other acids such as those known compounds referred to hereinbefore may be added within the limits not jeopardizing the objects and effects of this invention. The range therefor is generally up to 12 mole percent based on the total acid component.

The diol component used in this invention comprises 1,4-butanediol as a main ingredient and a specified proportion of diethylene glycol. Aside from diethylene glycol, there are known alkanediol such as ethylene glycol, propylene glycol, 1,6-hexanediol, etc. and polyalkylene glycols such as triethylene glycol, polyethylene glycol, polypropylene glycol, polytetramethylene glycol, etc. but the addition of these glycols without the addition of diethylene glycol do not result in satisfactory performance characteristics.

As a polyester hot melt adhesive in which 1,4-butanediol is a main diol component is generally fast in crystallization and, therefore, such a composition is advantageously used in this invention which is directed to high speed adhesion. In this invention, by using diethylene glycol in the range of 15 to 40 mole percent of the total diol component, a marked increase in bond strength can be obtained while the high speed adhesion characteristic is fully maintained. If the amount of diethylene glycol used in combination with 1,4-butanediol is less than 15 mole percent, the affinity for the substrate will not be sufficiently high and the bond strength will decrease. The preferred proportions of 1,4-butanediol and diethylene glycol in the diol component are 65 to 80 mole percent and 20 to 35 mole percent, respectively. In carrying this invention into practice, other known diol compounds may be added to the diol component within limits that will not jeopardize the objects and effects of the invention. Generally, the proportion of such other diols is not greater than 10 mole percent.

The degree of polymerization of said copolyester for use in this invention can be conveniently expressed in terms of reduced viscosity, and the reduced viscosity (concentration 0.5 g/dl) of the copolyester in a 1:1 (weight/weight) mixture of phenol and tetrachloroethane at 30° C. is preferably in the range of 0.8 to 1.4 dl/g. Below this degree of polymerization, a marked decrease in bond strength is inevitable so that the intrinsic properties of the polymer cannot be fully exploited. If the degree of polymerization exceeds the upper limit mentioned above, the poor melt fluidity makes high-speed adhesion difficult and the decrease in bonding power is also undesirably great. The preferred range of reduced viscosity is 1.0 to 1.4 dl/g.

The copolyester according to this invention should have a melting point between 160° C. and 200° C. If the melting point is below 160° C., the copolyester having the composition of this invention has only a low glass transition point (Tg) so that, when formed into film, it tends to suffer from a decrease in initial Young's modulus and, moreover, its workability in the film-forming process is markedly affected. In addition, the heat resistance also decreases in use as an adhesive. On the other hand, if the melting point of the copolyester exceeds 200° C., high speed adhesion becomes difficult. The preferred melting point range of the copolyester is 170° to 190° C.

This invention is carried into practice by molding a copolyester having the composition defined hereinbefore into a film under such selected film manufacturing conditions as will impart the above physical properties thereto.

The heat of crystal fusion of the film is the value measured using a differential scanning calorimeter (DSC). According to studies by the present inventors, it is of great importance to manufacture a film in such a manner that the heat of crystal fusion will lie within the aforementioned range in order that the hot melt adhesive in the form of a film may be used with advantage for high speed adhesion. Thus, it has been found that if the heat of crystal fusion is less than 5 cal/g, the tensile shear bonding strength is considerably decreased. On the other hand, if the above value is greater than 10 cal/g, high speed adhesion generally becomes difficult and the T-peel strength in the bonded area, which is not important at low speed adhesion is decreased. The preferred range of heat of crystal fusion is 6 to 9 cal/g.

The haze of the film is the value measured by the method of JIS-K-6714-1977. Haze is the parameter related to the crystallinity and internal microstructure of a film and largely dependent upon crystal size. The present inventors found that in order to obtain a film having properties desired in adhesives, it is important to ensure that the film manufacturing conditions are adequate in respect of this parameter as well. This is particularly true with high speed adhesion. Haze does not have so remarkable an influence upon bond strength in low speed adhesion but if the haze is in excess of 35% in high speed adhesion, there occurs a marked decrease in peel strength across the adhesion interface. Thus, the haze is desirably as low as possible for high speed bonding purposes. However, if the haze is too small, below 5%, the slip property of the film is so much affected as to interfere with film-forming property. The preferred range of haze is 8 to 20 percent.

The film according to this invention has an initial Young's modulus at 22° C. in the range of $3 \times 10^3$ kg/cm$^2$ to $30 \times 10^3$ kg/cm$^2$. If the initial Young's modulus is below the lower limit of the above range, the problem of dimensional instability is encountered, for even a slight tension to the film may cause it to lengthen in the course of film production as well as in bonding. If the film has a Young's modulus in excess of the upper limit of the aforementioned range, it is not only impossible to obtain a sufficient peel strength but the film becomes hardened so that it cannot be easily taken up in the film manufacturing process.

The foregoing performance parameters of the film can be controlled within the desired ranges by selecting the proper polyester composition and film manufacturing conditions. For example, in order to control the haze, it is expedient to adjust the surface temperature of the casting roll immediately downstream from the die extrusion stage. Lowering the surface temperature of the roll results in a lower degree of haze. If a further decrease in haze is desired, resort may be taken to forced cooling with air.

The heat of crystal fusion can be controlled by adjusting the polymer composition or/and conditions following the melt extrusion stage. The heat of crystal fusion can be reduced by copolymerizing isophthalic acid and diethylene glycol, while the heat of crystal fusion can be increased by a gradual cooling of the film after melt extrusion.

If the initial Young's modulus of the film is still outside the desired range, it can be improved by orientation of the film.

While the thickness of the film as a hot melt adhesive cannot be stated in general terms, it is preferably in the range of 40 to 200 μm.

In order to facilitate the use of the polyester according to this invention as a hot melt adhesive, it is possible to incorporate therein an antioxidant, a substance that imparts electrical conductivity to the film (e.g. metal or carbon powder), a metal oxide that permits melting by dielectric heating (e.g. iron oxide) or/and a colorant (e.g. a pigment such as titanium oxide). Preferred examples of said antioxidant include phenolic antioxidants such as 2,6-di-t-butyl-p-cresol and 2,2'-methylenebis(4-methyl-6-t-butylphenol), etc.

The substrates to which the film of this invention is applicable include metals, plastics, textile fibers, paper, ceramics and other materials which withstand the bonding heat required for hot melt adhesives. Particularly, the film shows an excellent bonding performance with aluminum, stainless steel and other metallic sheets or plates. In bonding these metallic substrates, approximately a doubling increase in bond strength can be achieved by such pretreatments as chemical treatment of the metal surface or primer coating of the surface with an epoxy resin, phenolic resin, epoxy-phenol resin or the like.

The film according to this invention can be applied, for example, to the lamination of metal sheets, the lap joint bonding of metal container parts, manufacture of a retort pouch by lamination of metal foil with plastic film, manufacture of water-resistant paper products by lamination of metal foil and paper board, and manufacture of fire-resistant composite products by laminating of metal sheet with wood. As the component substances of the copolyester of this invention are all in conformity with requirements for food packaging use and the copolymer substantially does not liberate substances upon extraction with alcohol, etc., the copolyester can be utilized broadly in the field of food packaging.

The film according to this invention can be used as a hot melt adhesive by placing it in a given shape between substrates and applying heat and pressure to the assembly. In this process, preliminary heating may be used as necessary and after bonding, quenching or rapid cooling is preferable.

As other uses for the film of this invention, it is possible to laminate the film on one side of a substrate so as to use the film as a protective layer, or bond this laminate thermally to other substrates.

EXAMPLE 1

A polyester chip was prepared using an acid component consisting of 92 mole % of terephthalic acid and 8 mole % of isophthalic acid and a diol component consisting of 76 mole % of 1,4-butanediol and 24 mole % of diethylene glycol. The above polyester chip had a melting point of 185° C. and a reduced viscosity of 1.25 dl/g in a 1:1 (weight/weight) mixture of phenol and tetrachloroethane at 30° C. This polyester chip was extruded through a T-die at 230° C. and cooled for 10 seconds on a casting roll at the surface temperature of 63°±2° C. The film was taken up in the form of a roll at a controlled rate to give a thickness of 100 μm. The resulting film had a heat of crystal fusion of 6.8 cal/g, a haze of 15% and an initial Young's modulus at 22° C. of $13.5 \times 10^3$ kg/cm$^2$.

The above film was subjected to bonding strength tests in accordance with Japanese Industrial Standard (JIS)-K-6848-1976, JIS-K-6850-1976 and JIS-K-6854-1973. Thus, the film was sandwiched between the specified metal members and the assembly was set between two larger-sized retaining metal sheets. The assembly was pressed under heating by means of a hot press held at a temperature higher by 40° C. than the melting point of the polyester. Thirty seconds after melting of the polyester, the above test piece was taken out and immersed in water at 20° C. to complete the bonding. (This process is referred to as regular adhesion). The thickness of the adhesive layer in the test piece was controlled at 100 μm with use of spacer means. The test piece was taken out from the water, wiped free of moisture, allowed to dry in the air in the test room for 2 days and this conditions specimen was subjected to bond strength determination. The measurement of bond strength was carried out at 20°±5° C. and 65°±20% R.H (relative humidity). The analysis for polyester composition was made by H$^1$-NMR.

The same thermal pressure bonding procedure as above was conducted for a very short time of 1 second and the specimen was cooled by immersion in water at 20° C. (This process is referred to as high speed adhesion). Using the resulting test specimen, the influence of thermal pressure time on tensile shear bonding strength and T-peel bonding strength was investigated. The results are shown in Table 1.

EXAMPLES 2 TO 6

The polyesters having the compositions and physical properties shown in Table 1 were each made into a film under the same conditions as Example 1 to provide the polyester films shown in Table 1. Using these films, bond strength tests were conducted under the same conditions as Example 1.

COMPARATIVE EXAMPLE 8

A suitable amount of each polyester chip having the composition and physical properties shown in Table 1 was placed between two Teflon sheets, molded into a sheet by means of a hot press at 230° C., and allowed to cool to give a film having a thickness of 100 μm. This film was sandwiched between metal members and the bond strength of the assembly was measured as in Example 1. The results are set forth in Table 1.

TABLE 1

| | Composition and physical properties of polyester chip | | | | | | | | Physical properties of polyester film | | | Tensile shear bonding strength[1] (kg/cm²) | | T-peel bonding strength[2] (kg/25 mm) | |
|---|---|---|---|---|---|---|---|---|---|---|---|---|---|---|---|
| | Acid component (mole %) | | | Diol component (mole %) | | | Reduced viscosity (dl/g) | m.p. (°C.) | Heat of crystal fusion (cal/g) | Haze (%) | Initial Young's modulus (kg/cm²) | High-speed adhesion | Regular adhesion | High-speed adhesion | Regular adhesion |
| | TA | IPA | Others | BD | DEG | Others | | | | | | | | | |
| Example | | | | | | | | | | | | | | | |
| 1 | 92 | 8 | — | 76 | 24 | — | 1.25 | 185 | 6.8 | 15 | 13.5 × 10³ | 141 | 145 | 10.8 | 11.2 |
| 2 | 97 | 3 | — | 70 | 30 | — | 1.25 | 180 | 7.2 | 14 | 12.3 × 10³ | 143 | 146 | 8.6 | 8.8 |
| 3 | 85 | 15 | — | 70 | 30 | — | 1.21 | 165 | 5.6 | 10 | 6.4 × 10³ | 137 | 139 | 11.8 | 12.0 |
| 4 | 93 | 7 | — | 80 | 20 | — | 1.23 | 187 | 7.6 | 16 | 11.6 × 10³ | 148 | 146 | 9.8 | 10.2 |
| 5 | 93 | 7 | — | 60 | 40 | — | 1.23 | 163 | 5.2 | 8 | 4.8 × 10³ | 133 | 135 | 9.5 | 12.1 |
| 6 | 92 | 4 | 4 (AD) | 76 | 24 | — | 1.21 | 184 | 7.8 | 17 | 10.8 × 10³ | 142 | 143 | 11.2 | 11.6 |
| Comparative example | | | | | | | | | | | | | | | |
| 1 | 100 | — | — | 70 | 30 | — | 1.25 | 184 | 8.3 | 14 | 25.0 × 10³ | 153 | 145 | 4.4 | 4.6 |
| 2 | 92 | 8 | — | 100 | — | — | 1.25 | 185 | 8.6 | 14 | 27.8 × 10³ | 102 | 96 | 3.2 | 3.3 |
| 3 | 100 | — | 8 (OPA) | 76 | 24 | — | 1.25 | 185 | 5.8 | 12 | 14.6 × 10³ | 126 | 124 | 6.2 | 5.9 |
| 4 | 92 | 8 | — | 76 | — | 24 (EG) | 1.25 | 183 | 5.2 | 14 | 35.1 × 10³ | 103 | 104 | 3.6 | 3.7 |
| 5 | 92 | 8 | — | 76 | — | 24 (HD) | 1.23 | 182 | 6.2 | 14 | 23.0 × 10³ | 101 | 101 | 4.2 | 3.9 |
| 6 | 92 | 8 | — | 76 | 24 | — | 0.7 | 184 | 7.2 | 16 | 14.2 × 10³ | 101 | 101 | 3.8 | 3.9 |
| 7 | 92 | 8 | — | 76 | 24 | — | 1.25 | 185 | 8.8 | 52 | 14.1 × 10³ | 101 | 146 | 6.3 | 10.6 |
| 8 | 95 | 5 | — | 95 | 5 | — | 1.21 | 198 | 9.5 | 56 | 26.3 × 10³ | 116 | 123 | 4.1 | 4.3 |

Note:
The symbols referring to polyester chip composition have the following meanings.
TA: Terephthalic acid, IPA: Isophthalic acid, (AD): Adipic acid, (OPA): Orthophthalic acid
BD: 1,4-Butanediol, DEG: Diethylene glycol, (EG): Ethylene glycol, (HD): 1,6-Hexanediol
[1]The substrate is a stainless steel sheet.
[2]The substrate is an aluminum sheet.

COMPARATIVE EXAMPLES 1 TO 6

The polyester chips having the compositions and physical properties shown in Table 1 were made into films under various conditions. The properties of these films are shown in Table 1. Each of these films was sandwiched between metal members and tested for bond strength in the same manner as Example 1. The results are set forth in Table 1.

COMPARATIVE EXAMPLE 7

A polyester film was produced in the same manner as Example 1 except that the surface temperature of the cooling roll was set at 85°±2° C. This film had a heat of crystal fusion of 8.8 cal/g, a haze of 52% and an initial Young's modulus at 22° C. of 14.1 kg/cm².

In the bond strength tests under the same conditions as Example 1, the above film showed the same tensile shear bonding strength as Example 1 in regular adhesion but manifested only a low tensile shear strength in high speed adhesion.

The above working and comparative examples show that the film manufactured from the specified composition and physical properties under conditions conducive to the specified parameter values has an excellent performance quality for use as a hot melt adhesive.

EXAMPLES 7 AND 8

A polyester chip was prepared using an acid component consisting of 92 mole % of terephthalic acid and 8 mole % of isophthalic acid and a diol component consisting of 76 mole % of 1,4-butanediol and 24 mole % of diethylene glycol in the same manner as Example 1. This polyester had a melting point of 185° C. and a reduced viscosity in 1/1 (weight/weight) phenol/tetrachloroethane at 30° C. of 1.25 dl/g. Using this polyester chip, a film having a thickness of 100 μm was produced. This film had a heat of crystal fusion of 6.8 cal/g, a haze of 15% and a Young's modulus at 22° C. of 13.5×10³ kg/cm².

To determine an indicator of safety to health in pool container applications, a soxhlet extraction test with various solvents was conducted. The extraction time was 24 hours. The results are set forth in Table 2.

TABLE 2

| Extractant solvent | Amounts of extraction (%)[1] |
|---|---|
| Acetone | 0.05 |
| Dioxane | 0.06 |
| 95% Ethanol | 0.01 |
| Distilled water | 0 |

[1]The amount of extraction is the percentage of the weight of extracted substance relative to the weight of the film before extraction.

It will be apparent from Table 2 that the impurity extracted from the above polyester film is very small. The amounts of extraction by acetone and dioxane are small as compared with the corresponding values for the polyethylene terephthalate bottle used as a food container. Moreover, soxhlet extraction caused little change in chip properties or in film properties.

Each of the above polyester films and films after said soxhlet extraction was bonded to primer-treated metal substrates in the same manner as Example 1 and subjected to determination of tensile shear and T-peel bonding strengths under the same conditions as Example 1. The results are set forth in Table 3. The primer treatment referred to above was conducted in the following manner. A phenol mixture of 45 wt. % phenol and 55 wt. % p-cresol was reacted with formal in (2.0 moles of formaldehyde per mole of mixed phenol) in the presence of an alkaline catalyst to give resol. Then, 50 wt. parts of this resol and 50 wt. parts of bisphenol A expoxy resin with a molecular weight of about 30,000 were prepared in a solvent mixture of isopropyl alcohol, xylene and ethyl acetate to give a solution with a solids content of 15 wt. % (primer dope). Using a brush, this dope was spread on stainless steel and aluminum sheets, dried in the air and then dried in a hot air dryer at 200° C. for 20 minutes whereby the primer was cured.

TABLE 3

|  |  | Tensile shear bonding strength (kg/cm$^2$) | | T-peel bonding strength (kg/25 mm) | |
|---|---|---|---|---|---|
|  |  | High-speed adhesion | Regular adhesion | High-speed adhesion | Regular adhesion |
| Example 7 | Unextracted film | 246 | 253 | 20.8 | 21.0 |
| Example 8 | Acetone-extracted film | 247 | 252 | 20.3 | 20.7 |

The above data show that the use of primer-treated substrates results in a further improvement in bond strength.

What is claimed is:

1. A hot melt adhesive in the form of a film of a copolyester, having excellent bonding strength in high speed adhestion, comprising: (a) a copolyester which comprises, as a dicarboxylic acid component, 80 to 97 mole percent of terephthalic acid and 3 to 20 mole percent of isophthalic acid and, as a diol component, 60 to 85 mole percent of 1,4-butanediol and 15 to 40 mole percent of diethylene glycol, and said copolyester having a reduced viscosity in the range of 0.8 to 1.4 dl/g and a melting point in the range of 160° to 200° C.; and said film having (b) a heat of crystal fusion in the range of 5 to 10 cal/g, (c) a haze value of 5 to 35 percent, and (d) an initial Young's modulus in the range of $3 \times 10^3$ kg/cm$^2$ to $30 \times 10^3$ kg/cm$^2$ and a thickness in the range of 40 to 200 μm.

2. A hot melt adhesive according to claim 1 wherein said copolyester comprises 85 to 95 mole percent of terephthalic acid, 5 to 15 mole percent of isophthalic acid, 65 to 80 mole percent of 1,4-butanediol and 20 to 35 mole percent of diethylene glycol, said polyester having a reduced viscosity of 1.0 to 1.4 dl/g and a melting point of 170° to 190° C., and said film having (b) a heat of crystal fusion in the range of 6 to 9 cal/g, (c) a haze value in the range of 8 to 20 percent and (d) an initial Young's modulus in the range of $3 \times 10^3$ to $30 \times 10^3$ kg/cm$^2$.

3. A hot melt adhesive according to claim 1 wherein said dicarboxylic acid component includes one or more other dicarboxylic acids in a proportion of not larger than 12 mole percent.

4. A hot melt adhesive according to claim 3 wherein said other dicarboxylic acids are aromatic dicarboxylic acids selected from the group consisting of orthophthalic acid, naphthalenedicarboxylic acid and 1,2-bis(p-carboxyphenoxy)ethane 5. A hot melt adhesive according to claim 3 wherein said other dicarboxylic acids are aliphatic carboxylic acids selected from the group consisting of succinic acid, adipic acid and sebacic acid.

6. A hot melt adhesive according to claim 1 wherein said diol component includes one or more other diols in a proportion of not larger than 10 mole percent.

7. A hot melt adhesive according to claim 6 wherein said other diols are alkane diols selected from the group consisting of ethylene glycol, propylene glycol and 1,6-hexanediol.

8. A hot melt adhesive according to claim 6 wherein said other diol components are polyalkylene glycols selected from the group consisting of triethylene glycol, polyethylene glycol, polypropylene glycol and polytetramethylene glycol.

9. The copolyester film of claim 1, which further comprises an antioxidant, a substance that imparts electrical conductivity thereto, a metal oxide that permits melting by dielectric heating or a coloring agent.

10. The copolyester film of claim 9, wherein said antioxidant is 2,6-di-t-butyl-p-cresol or 2,2'-methylenebis(4-methyl-6-t-butylphenol).

* * * * *